(12) United States Patent
Rice et al.

(10) Patent No.: US 6,351,949 B1
(45) Date of Patent: Mar. 5, 2002

(54) INTERCHANGEABLE COMBUSTOR CHUTE

(75) Inventors: Edward Claude Rice, Indianapolis; Robert Anthony Ress, Jr., Carmel; Timothy Carl Roesler, Plainfield, all of IN (US)

(73) Assignees: Allison Advanced Development Company; Rolls-Royce Corporation, both of Indianapolis, IN (US)

( * ) Notice: Subject to any disclaimer, the term of this patent is extended or adjusted under 35 U.S.C. 154(b) by 0 days.

(21) Appl. No.: 09/390,147

(22) Filed: Sep. 3, 1999

(51) Int. Cl.[7] .................................................. F02C 1/00
(52) U.S. Cl. .............................. 60/752; 60/759; 403/316
(58) Field of Search .......................... 60/752, 759, 754, 60/39.37; 403/315, 316, 317, 320, 334

(56) References Cited

U.S. PATENT DOCUMENTS

| 2,547,619 A | 4/1951 | Buckland |
| 2,699,040 A | 1/1955 | Gaubatz |
| 3,500,639 A | 3/1970 | Stamm |
| 3,981,142 A | 9/1976 | Irwin |
| 4,748,806 A | * 6/1988 | Drobny ..................... 60/39.32 |
| 4,875,339 A | 10/1989 | Rasmussen et al. |
| 5,067,324 A | 11/1991 | Beytes et al. |
| 5,235,805 A | * 8/1993 | Barbier et al. ............. 60/39.23 |
| 5,323,601 A | 6/1994 | Jarrell |
| 5,337,583 A | 8/1994 | Giles et al. |
| 5,524,430 A | 6/1996 | Mazeaud et al. |
| 5,560,197 A | 10/1996 | Ansart et al. |
| 5,581,999 A | 12/1996 | Johnson |
| 5,687,572 A | * 11/1997 | Schrantz et al. .............. 60/753 |

OTHER PUBLICATIONS

Imo Industries, Inc., Adel Fasteners Division, product information, Model No. Adel 10759.
Eight Photographs of the Model No. Adel 10759. Date Unknown.

* cited by examiner

Primary Examiner—Charles G. Freay
(74) Attorney, Agent, or Firm—Woodard, Emhardt, Naughton, Moriarty & McNett

(57) ABSTRACT

An interchangeable combustor chute for directing airflow into a gas turbine engine combustor. In one aspect the combustor chute is secured to the combustor liner by mechanical fastener. The combustor chute is formed of a high temperature resistant material such as ceramics.

23 Claims, 9 Drawing Sheets

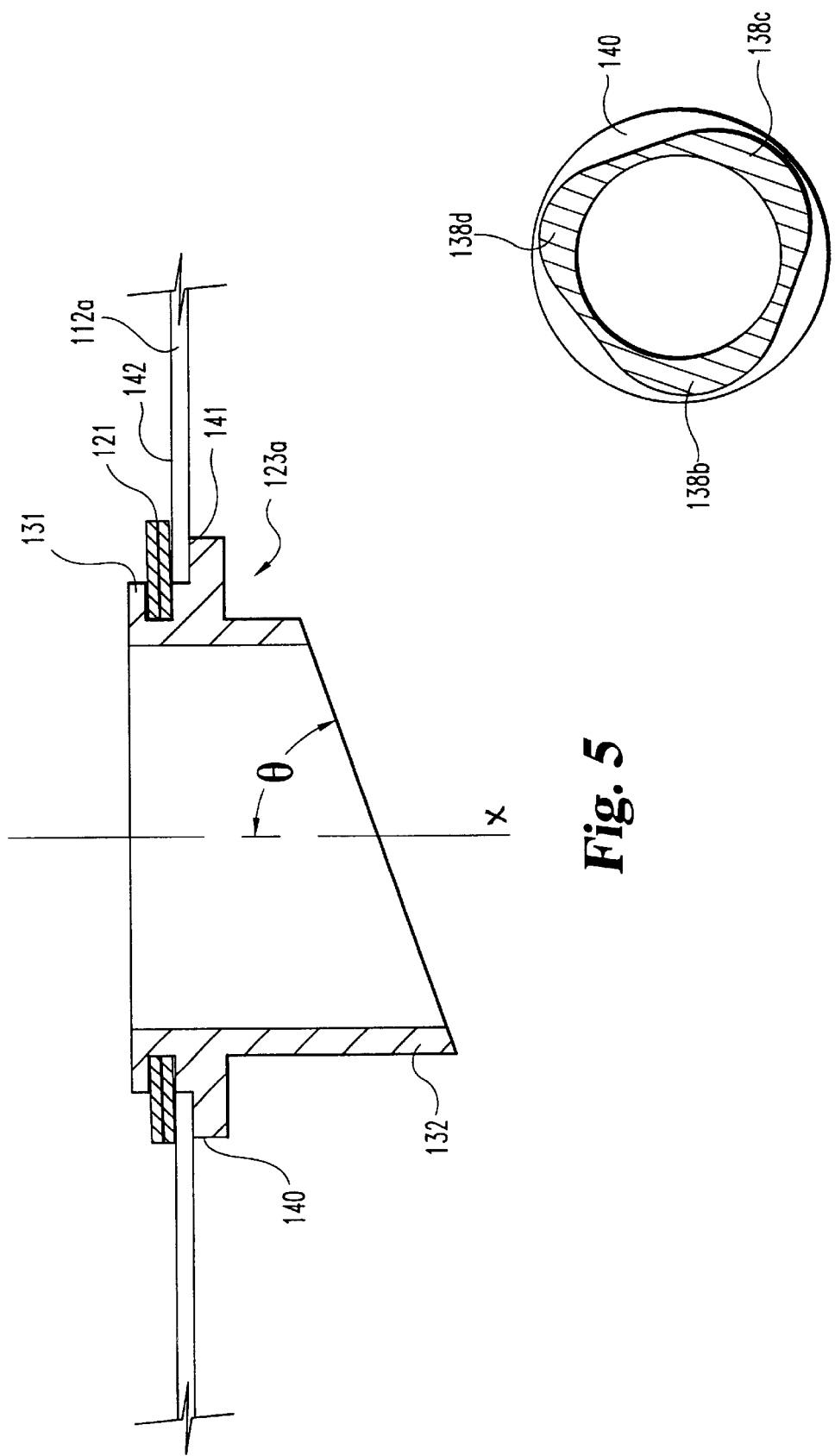

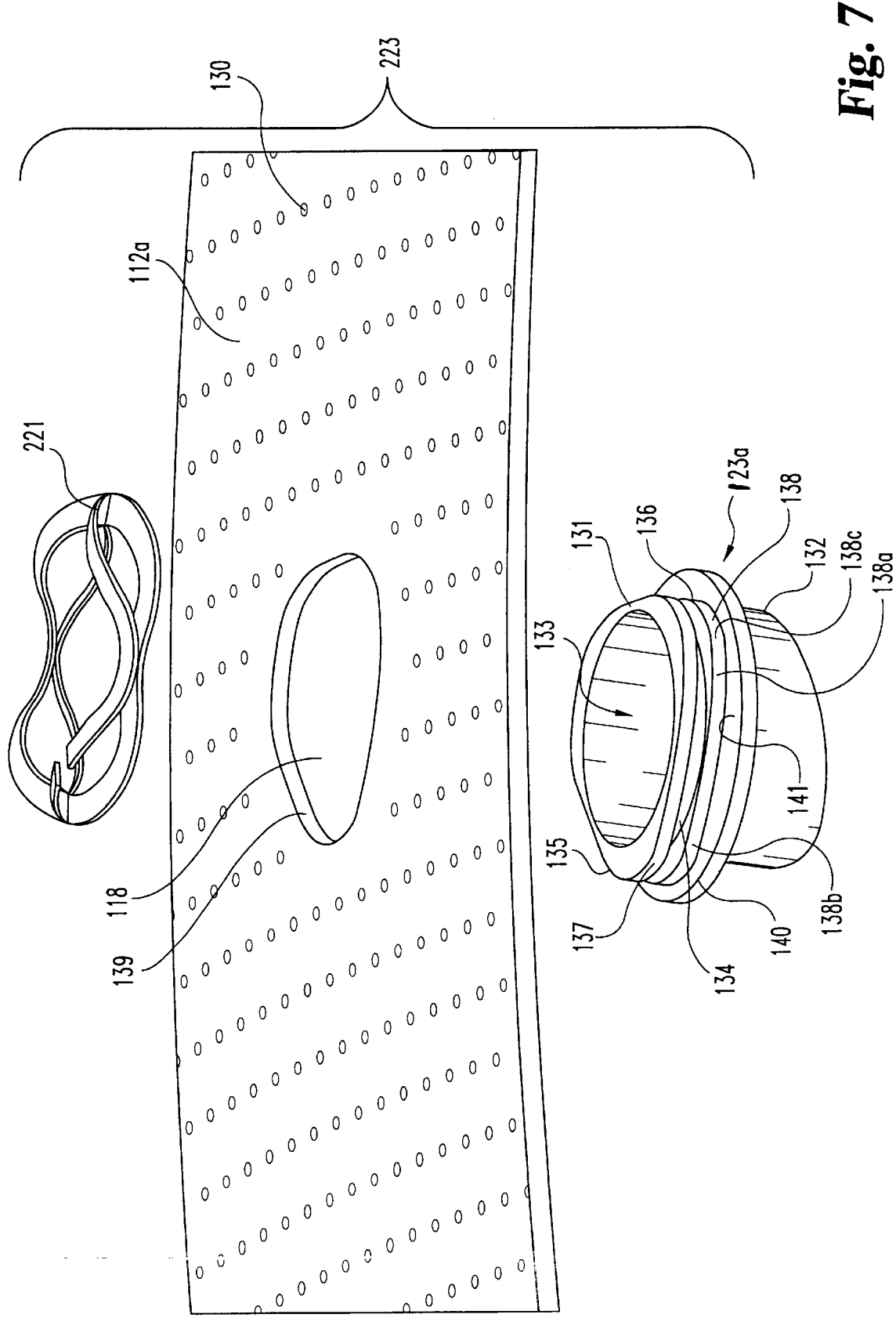

INTERCHANGEABLE COMBUSTOR CHUTE

This invention was made with Government support under Contract No. N00019-96-C-0176 awarded by the United States Navy. The Government has certain rights in this invention.

BACKGROUND OF THE INVENTION

The present invention relates generally to the design and construction of a gas turbine engine combustor having a high temperature chute for directing airflow into the combustor. More particularly, in one embodiment of the present invention, a combustor chute is secured to the combustor liner by a mechanical retaining ring. Although the present invention was developed for use in a gas turbine engine, certain applications may be outside this field.

A long-recognized need by many gas turbine engine designers is to achieve both a greater thermodynamic efficiency and increased power output per unit of engine weight. Currently, increased efficiency and engine performance can be obtained by increasing the operating temperature of the hot working fluid. Theoretically, a gas turbine engine could operate at stoichiometric combustion ratios in order to extract the greatest possible energy from the fuel consumed. However, temperatures at stoichiometric and even non-stoichiometric combustion are generally beyond the endurance capabilities of traditional metallic gas turbine engine components.

The hot working fluid in the gas turbine engine results from the combustion of a fuel mixture within a combustor. Air is introduced through an opening in a combustor liner into the combustion chamber to provide the desired fuel mixture. In order to enhance the combustion process, many gas turbine engine designs utilize a metal combustor chute that is welded to the combustor liner to direct the air into the combustor chamber. The welded metal chute design has limited the type of materials used in the combustor chute and does not facilitate replacement of combustor chutes that have been damaged or eroded by the environment.

Although the prior technique utilizing a welded metal combustor chute is a step in the right direction, the need for additional improvement still remains. The present invention satisfies this need in a novel and non-obvious way.

SUMMARY OF THE INVENTION

One form of the present invention contemplates a combustor chute formed of a high temperature resistant material.

Another form of the present invention contemplates a combustor chute assembly comprising a replaceable combustor chute and a mechanical fastener.

Another form of the present invention contemplates an apparatus, comprising: a mechanical housing; a combustor liner located within and spaced from the housing and having at least one opening therethrough, the combustor liner defining a space adapted for the combustion of a fuel; a member having a first end and a second end and a passageway therethrough adapted for the passage of a fluid into the space for the combustion of fuel, the first end received within the at least one opening and the second end extending into the space; and means for releasably fastening the first end with the liner.

Yet another form of the present invention contemplates a combustor for a gas turbine engine comprising: a mechanical housing; a combustor liner located within the housing and defining a combustion chamber adapted for the combustion of a fuel, the combustion liner having at least one opening therein; a passageway formed between the mechanical housing and the combustor liner, the passageway adapted for the passage of a fluid to the at least one opening; at least one combustor chute having a first portion received within the at least one opening and in fluid communication with the passageway and a second portion extending into the combustion chamber; and a removable fastener engaging with the at least one combustor chute to releasably secure the at least one combustor chute with the combustor liner.

Also, another form of the present invention contemplates a gas turbine engine combustor chute, comprising: a single piece body member having a first end and a second end with a passageway therethrough, the first end having a fastener-receiving portion adapted to receive a fastener therein and to secure the first end with a combustor liner.

Yet another form of the present invention contemplates a method of installing a combustor chute within a gas turbine engine combustor, comprising: positioning the combustor chute within the combustion chamber; inserting one end of the combustor chute into an opening formed in a combustor liner of the combustor; passing at least a portion of the one end of the combustor chute through the combustor liner so that it extends from the liner; and engaging a mechanical fastener with the portion of the combustor chute extending from the combustor liner.

One object of the present invention is to provide a unique combustor chute for a gas turbine engine.

Related objects and advantages of the present invention will be apparent from the following description.

BRIEF DESCRIPTION OF THE DRAWINGS

FIG. 5 is a cross-sectional view of the combustor chute of FIG. 4 coupled to a combustor liner.

FIG. 6 is a cross-sectional view of the combustor chute taken along line 6—6 of FIG. 3.

FIG. 7 is an exploded view of an alternate embodiment of a combustor chute assembly coupled to a combustor liner.

DESCRIPTION OF THE PREFERRED EMBODIMENTS

Figure 1:
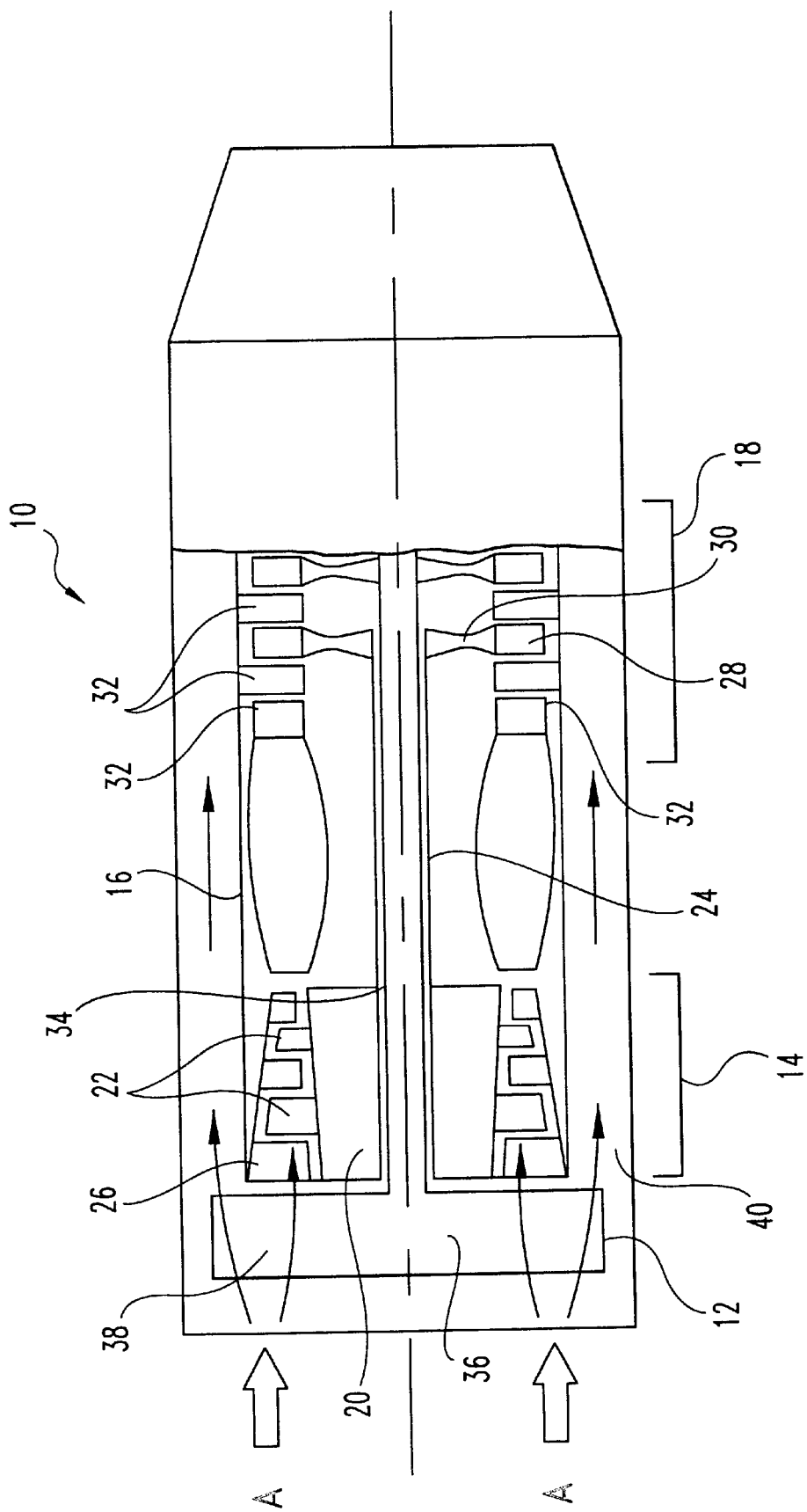
FIG. 1 is an illustrative view of a gas turbine engine.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and/or method, and such further applications of the principles of the invention as illustrated therein being contemplated as would normally occur to one skilled in the art to which the invention relates.

Referring to FIG. 1, there is illustrated a schematic representation of a gas turbine engine 10, which includes a fan section 12, a compressor section 14, a combustor section 16, and a turbine section 18 that are integrated together to provide an aircraft flight propulsion engine. This type of gas turbine engine is generally referred to as a turbo-fan. One alternate form of a gas turbine engine includes a compressor section, a combustor section and a turbine section that have been integrated together to produce an aircraft flight propulsion engine without the fan section. The term aircraft is generic and includes helicopters, airplanes, missiles, unmanned space devices and any other substantially similar devices. It is important to realize that there are multitudes of ways in which the gas turbine engine components can be linked together. Additional compressors and turbines could be added with intercoolers connecting between the compressors, and reheat combustion chambers could be added between the turbines. The present invention is applicable to all types of gas turbine engines and is not intended to be limited herein to an engine similar to that shown in the schematic.

A gas turbine engine is equally suited to be used for an industrial application. Historically, there has been widespread application of industrial gas turbine engines, such as pumping sets for gas and oil transmission lines, electricity generation, and naval propulsion.

The compressor section 14 includes a rotor 20 having a plurality of compressor blades 22 coupled thereto. The rotor 20 is affixed to a shaft 24 that is rotatable within the gas turbine engine 10. A plurality of compressor vanes 26 are positioned within the compressor section 14 to direct the fluid flow relative to blades 22. Turbine section 18 includes a plurality of turbine blades 28 that are coupled to a rotor disk 30. The rotor disk 30 is affixed to the shaft 24, which is rotatable within the gas turbine engine 10. Energy extracted in the turbine section 18 from the hot gas exiting the combustor section 16 is transmitted through shaft 24 to drive the compressor section 14. Further, a plurality of turbine vanes 32 are positioned within the turbine section 18 to direct the hot gaseous flow stream exiting the combustor section 16.

The turbine section 18 provides power to a fan shaft 34, which drives the fan section 12. The fan section 12 includes a fan 36 having a plurality of fan blades 38. Air enters the gas turbine engine 10 in the direction of arrows A and passes through the fan section 12 into the compressor section 14 and a bypass duct 40.

Figure 2:
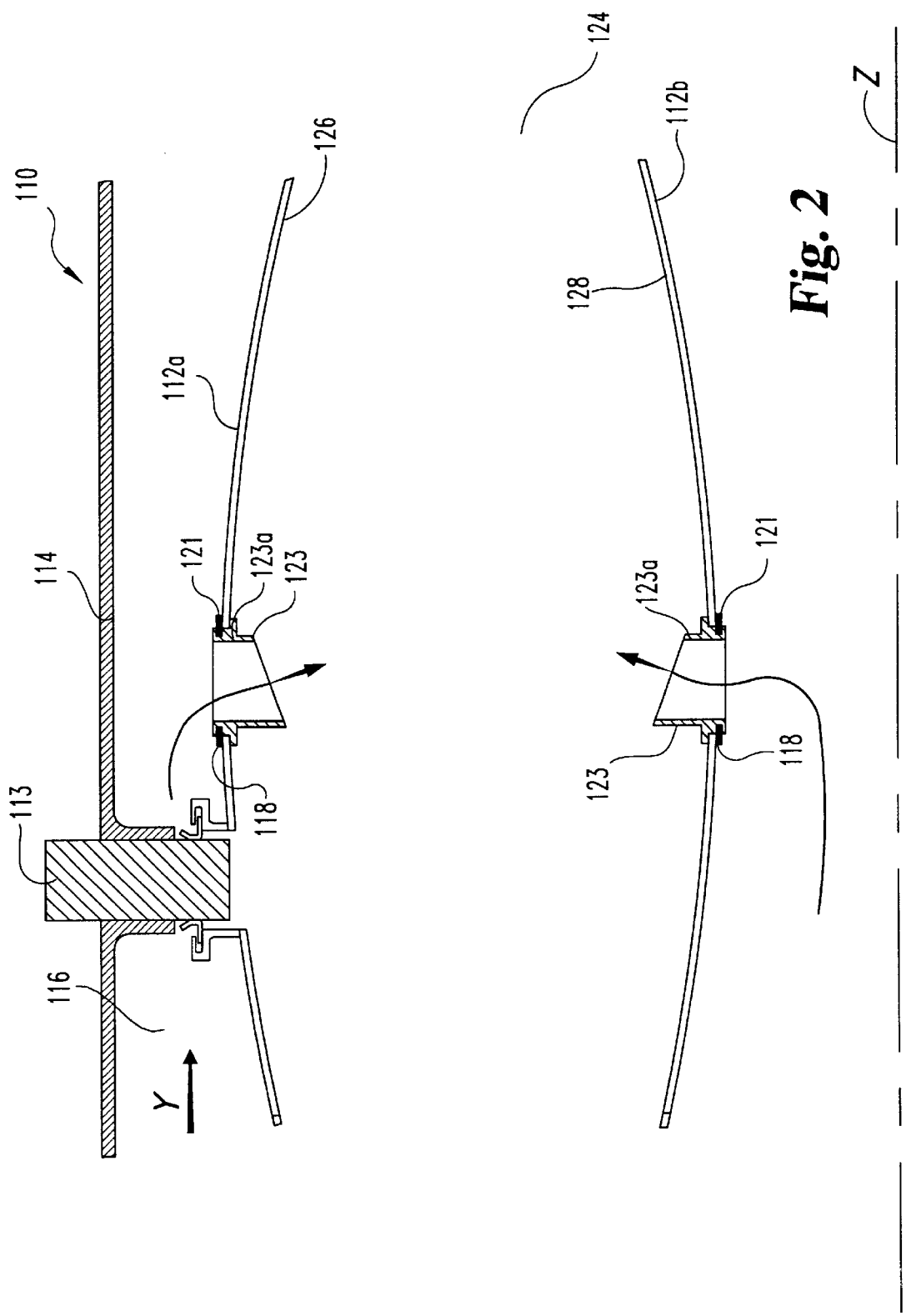
FIG. 2 is a sectional view of a combustor comprising a portion of a gas turbine engine.

Referring to FIG. 2, there is illustrated a partial sectional view of the combustor section 16. The combustor apparatus 110 comprises a mechanical housing/case 114, an igniter 113, an outer combustor liner 112a, an inner combustor liner 112b, a fueling nozzle (not illustrated) and at least one combustor chute assembly 123. In the embodiment illustrated herein the outer combustor liner 112a and the inner combustor liner 112b define an annular combustion chamber 124 that is substantially symmetrical about a centerline Z. However, the present invention is not limited to an annular combustor and is applicable with other combustor apparatus configurations such as but not limited to a single can, multi-can and can-annular. The combustor liners 112a and 112b are spaced from the mechanical housing/case 114 and a passageway 116 provides for the passage of compressed fluid from the compressor section 14 in the general direction of arrow Y.

The combustor liners 112a and 112b include inner surfaces 126 and 128 respectively that are located within the combustion chamber 124 and are exposed to the hot gases generated during the combustion process. An aperture 118 is formed within at least one of the combustor liners 112a and 112b for the receipt of the combustor chute 123a. The combustor chute 123a is received within the aperture 118 and secured to the combustor liner by a mechanical fastener 121. The present invention contemplates a combustor apparatus having at least one combustor chute 123a, and more preferably has a plurality of combustor chutes 123a. The position of the individual combustor chutes for a specific design can be determined by techniques such as rig testing and CFD analysis. The combustor chutes 123a may be staggered or aligned with fuel nozzles, spray bars, or any other orifice that delivers fuel within a combustor scheme. Axial orientation of the combustor chutes 123a may be in a single row or multiple rows, which are either staggered or aligned relative to each other.

The combustor chute 123a extends into the combustion chamber 124 and is subjected to the hot gases from the combustion process. In a preferred form the combustor chute 123a is a unitary member, however an integral combustor chute formed of a plurality of interconnected pieces is also contemplated herein. The combustor chute 123a and the combustor liners 112a and 112b can be formed of the same material or of dissimilar materials. Combustor chute 123a is formed of a high temperature resistant material and more preferably the material is suitable for use in an environment where the temperature can be in excess of 3000° Fahrenheit. More preferably, the combustor chute 123a is formed of a high temperature metallic material, such as, but not limited to, Hastelloy X or Mar-M247, or an intermetallic material, and most preferably the combustor chute 123a is formed of a ceramic material.

Figure 3:
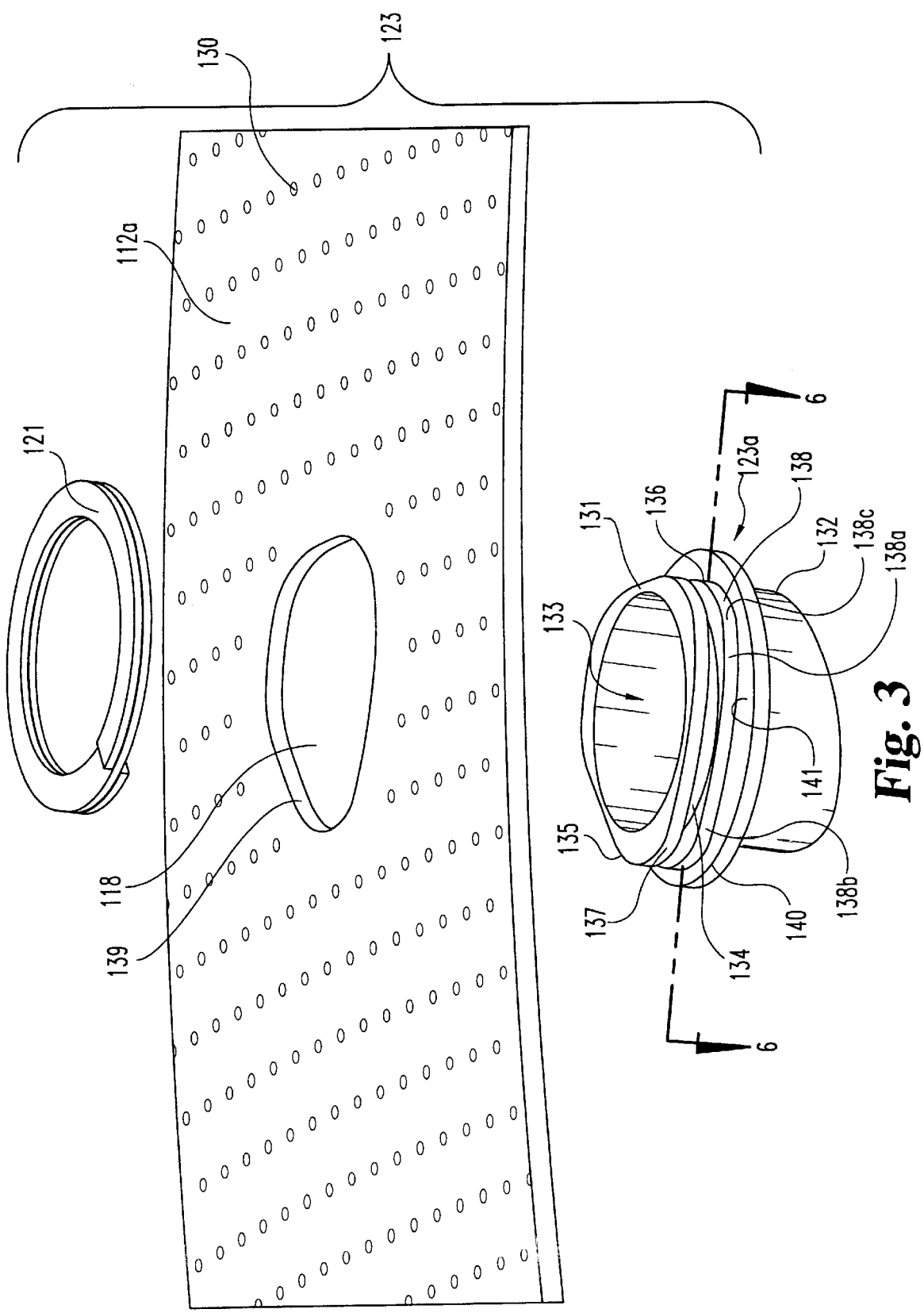
FIG. 3 is an enlarged exploded view of the combustor chute assembly of FIG. 2.
Figure 4:
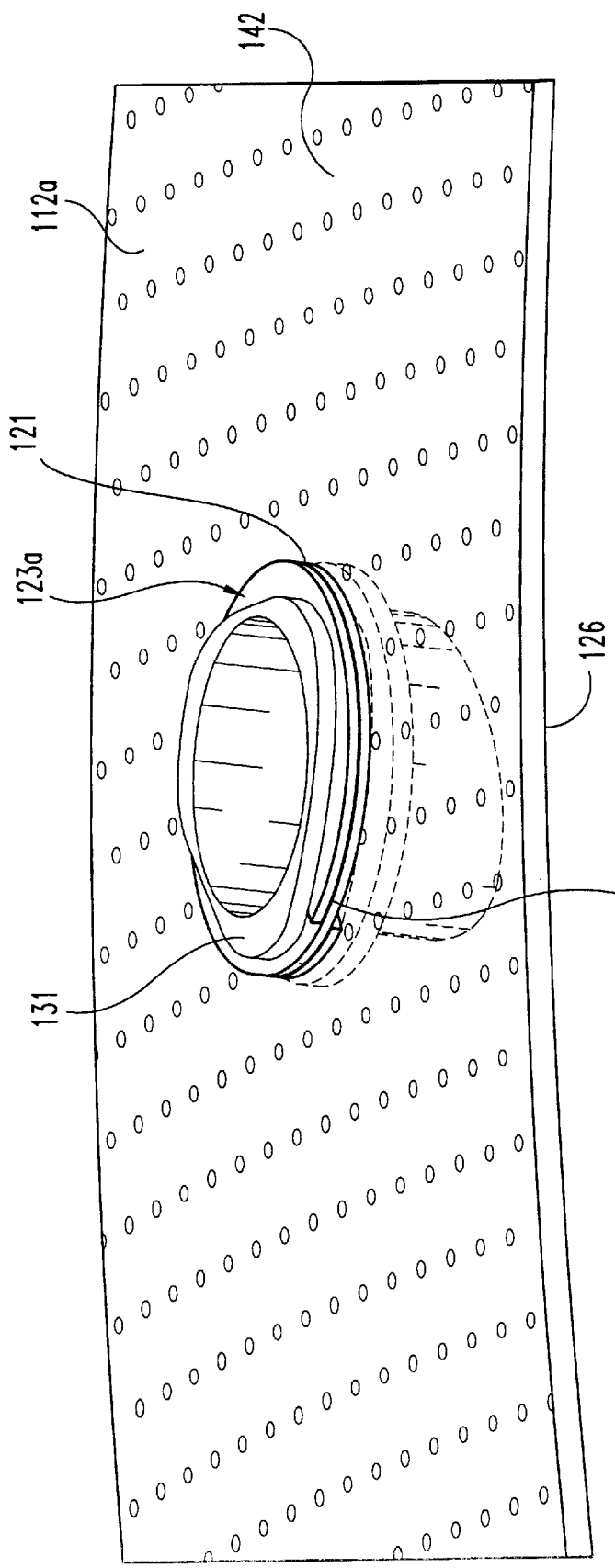
FIG. 4 is perspective view of the combustor chute assembly of FIG. 3 coupled to a combustor liner.

Referring to FIGS. 3 and 4, there is illustrated an exploded view of the combustor chute assembly 123 proximate a portion of the outer combustor liner 112a. In one embodiment the combustor liner has a plurality of cooling holes 130 formed therethrough, however other combustor liners having no cooling holes and/or alternate cooling designs are contemplated herein. Combustor chute assembly 123 includes: combustor chute 123a having a first end 131, an opposite second end 132, and a passageway 133 therebetween for the passage of a fluid; and the mechanical fastener 121. First end 131 includes a fastener—receiving portion 134 for receiving and retaining the mechanical fastener 121. In one embodiment the fastener—receiving portion 134 is disposed between a first portion 135 and second portion 136. The second portion 136 is sized to fit closely within the aperture 118 within the combustor liner 112a. A flange member 140 extends from the chute assembly 123a and has a surface 141 adapted for abutting the inner surface 126 or 128 of the respective combustor liner. The flange member 140 stopping further passage of the combustor chute 123a into the opening 118. In one preferred embodiment, first portion 135 includes a first set of lobes 137 and second portion 136 includes a second set of lobes 138. It is understood herein that the combustor chute assembly 123 can also be coupled with the inner combustor liner 112b.

Mechanical fastener 121 is interengageable with fastener-receiving portion 134 and preferably is a retaining ring that is elastically deformed during placement. More preferably, the retaining ring has a two-turn design so that in the event of a fracture the combustor chute 123a will not fall into the combustion chamber. The present invention contemplates other types of mechanical fasteners for removably coupling the combustor chute 123a to the combustor liner 112a, such as but not limited to snap rings, pins, spring clips, and threaded fasteners.

As discussed previously, the combustor liner includes an opening 118 formed therethrough for receipt of the combustor chute 123a. The opening 118 extending through the respective combustor liner and has a sidewall surface 139 defining the opening. While opening 118 has been illustrated as a generally lobed-shaped opening, it is understood herein that the opening can be formed in alternative shapes including but not limited to circular, elliptical, polygonal, triangular, square, rectangular, and slots. The sidewall surface 139 is configured to substantially correspond with the outer surface 138a of the second set of lobes 138.

In one embodiment the second set of lobes 138 define an anti-rotation portion that engages with the opening 118 to prevent rotation relative to the combustor liner. In one preferred form, the second set of lobes 138 includes at least one lobe and preferably a plurality of lobes. In a more preferred embodiment the second set of lobes comprises three lobed-shaped portions 138b, 138c and 138d (not illustrated). The shape of the second set of lobes is selected to correspond with the shape of the opening 118, and more particularly the sidewall surface 139. It is understood that the lobe portions 138b, 138c and 138d can be replaced by members having other shapes that would occur to those skilled in the art, such as, projections, tabs, ears, and the like, which can define any number of shapes, such as curved, triangular and/or rectangular shaped projections. In a preferred embodiment the first set lobes 137 and the second set of lobes 138 have substantially the same shape. However, in alternate embodiments the two sets of lobes 137 and 138 have different shapes.

Referring to FIG. 4, there is illustrated a perspective view of the combustor chute 123a coupled to the combustor liner 112a. The first end 131 of combustor chute 123a is received within the opening 118 and the flange member 140 abuts the inner surface 126 of the combustor liner 112a. Further, the fastener-receiving portion 134 is positioned above the surface 142 of the combustor liner 112a. The mechanical fastener 121 is positioned within the fastener-receiving portion 134 and extends over a portion of the surface 142 to hold the combustor chute 123a against the liner 112a.

Referring to FIG. 5, there is illustrated a cross-sectional view of the combustor chute 123a coupled to the combustor liner 112a. In one embodiment the combustor chute 123 has a scarf angle $\theta$ formed on the second end 132 thereof, and preferably the scarf angle $\theta$ is within a range of about 60° to about 120°. In one embodiment, the combustor chute has a scarf angle of about 90°. The scarf angle $\theta$ is formed relative to a centerline X. Flange member 140 prevents the passage of the second end 132 of the combustor chute 123a into the opening 118. In the illustrated embodiment the surface 141 defined on the flange member 140 abuts the inner surface 126 of the combustor liner 112a and the fastener 121 abuts the outer surface 142 of the combustor liner 112a. Further, while fastener 121 is used to mechanically secure the combustor chute 123a to the combustor liner 112a it can be readily removed to allow for removal of the combustor chute 123a for repair and/or replacement.

It will be appreciated that the combustor chute 123a can be configured so that it may or may not directly contact the combustor liner. Preferably, combustor chute 123a is sized to allow for differences in thermal expansions between the combustor liner 112a and the combustor chute 123a so as to inhibit cracking of the respective components during the heating and cooling cycles. Further, it is understood that a thermally resistive material can be placed between the combustor chute 123a and the combustor liner 112a.

With reference to FIG. 6, there is illustrated a sectional view taken along line 6—6 of FIG. 3. In a preferred embodiment the combustor chute 123a includes an alignment feature to insure that the combustor chute is oriented in a predetermined manner within the opening 118. The alignment feature utilizes a geometric relationship that only allows the insertion of the combustor chute 123a into the opening 118 in one orientation. In a preferred embodiment the second set of lobes 138b, 138c and 138d are configured about the combustor chute 123a in a non-equidistant relationship to each other. Thus, the configuration of lobes 138b, 138c and 138d are adapted to align the combustor chute 123a in a predetermined orientation within the opening 118 of the liner 112a. One embodiment of the present invention does not include the alignment feature, and alternate embodiments of the alignment feature include varying structures utilized for affecting the alignment between the combustor chute 123a and the combustor liner 112a.

Figure 8:
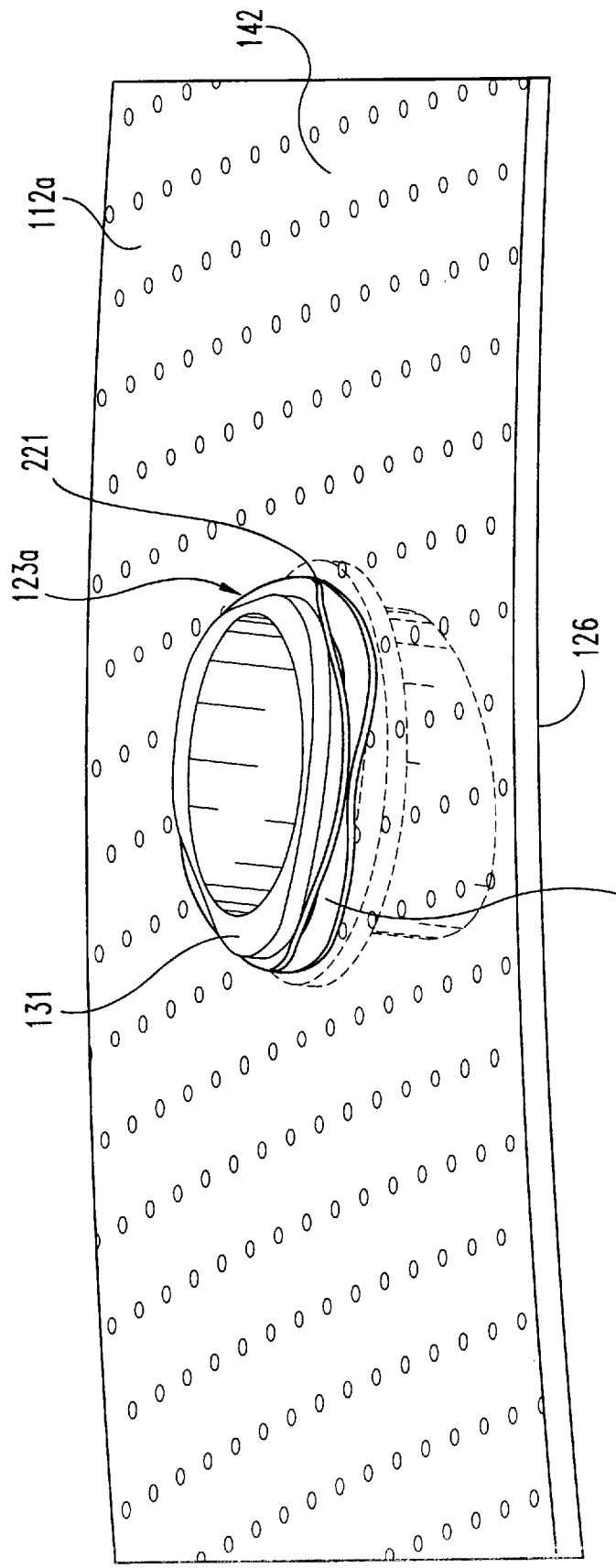
FIG. 8 is a perspective view of the combustor chute assembly of FIG. 7 coupled to a combustor liner.

With reference to FIGS. 7 and 8, there is illustrated an alternative embodiment of the combustor chute 123a coupled to the combustor liner 112a. The combustor chute 123a and combustor liner 112a are substantially similar to the previously described combustor chutes and liners and like feature numbers will be utilized to represent like features. In one embodiment mechanical fastener 221 is defined by an energizing device that preloads and retains the combustor chute 123a against the inner surface 126 of the combustor liner 112a. The mechanical fastener 221 is preferably a wave washer having a spring rate that preloads the combustor chute 123a against the liner 112a. Mechanical fasteners suitable to preload the combustor chute against the combustor liner are believed known to those of ordinary skill in the art. Smalley Steel Ring Co., 385 Gilman Aveneue, Wheeling Ill. is an example of one company that distributes a line of spring retaining rings.

Figure 9:
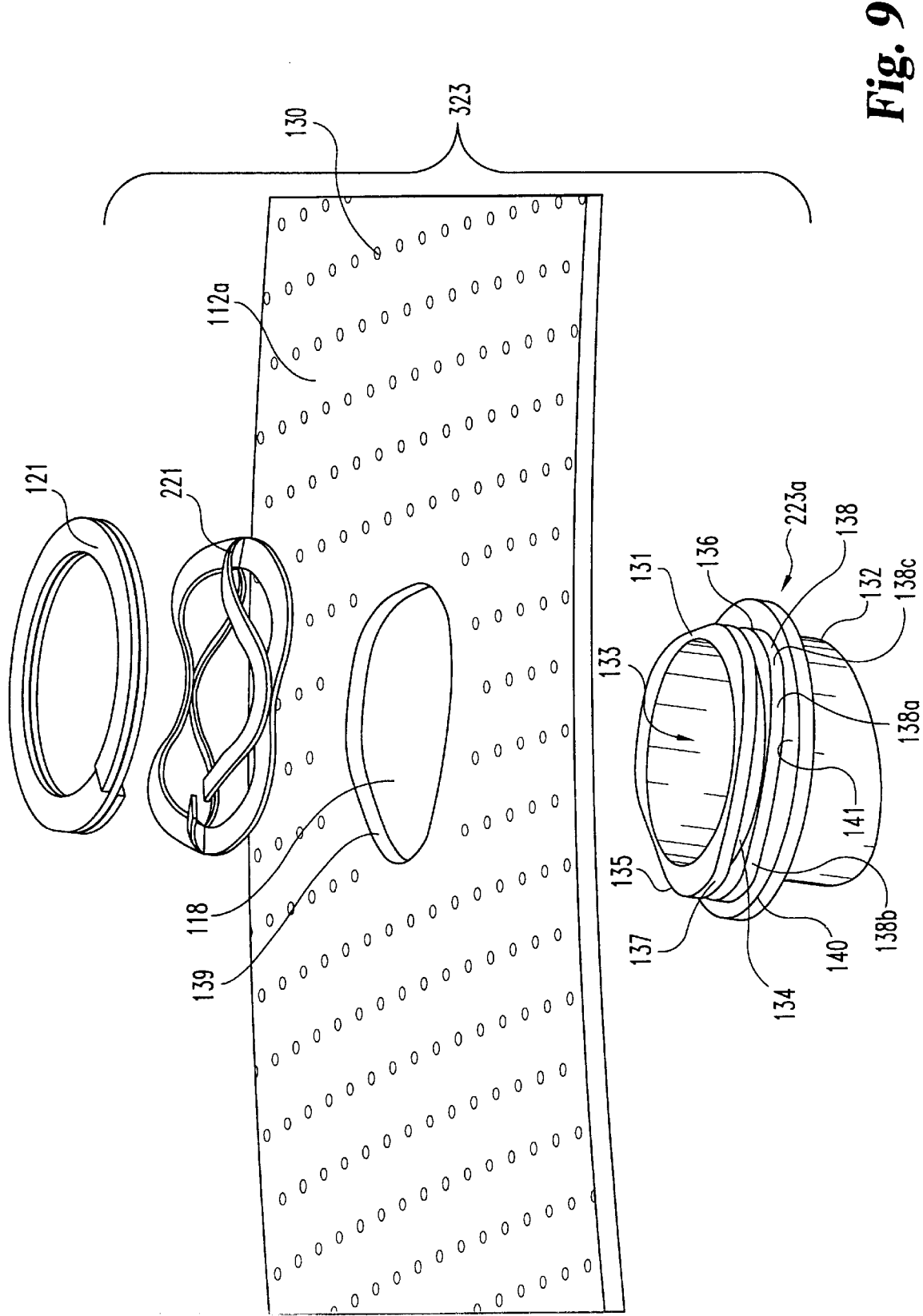
FIG. 9 is an exploded view of another embodiment of a combustor chute assembly coupled to a combustor liner.
Figure 10:
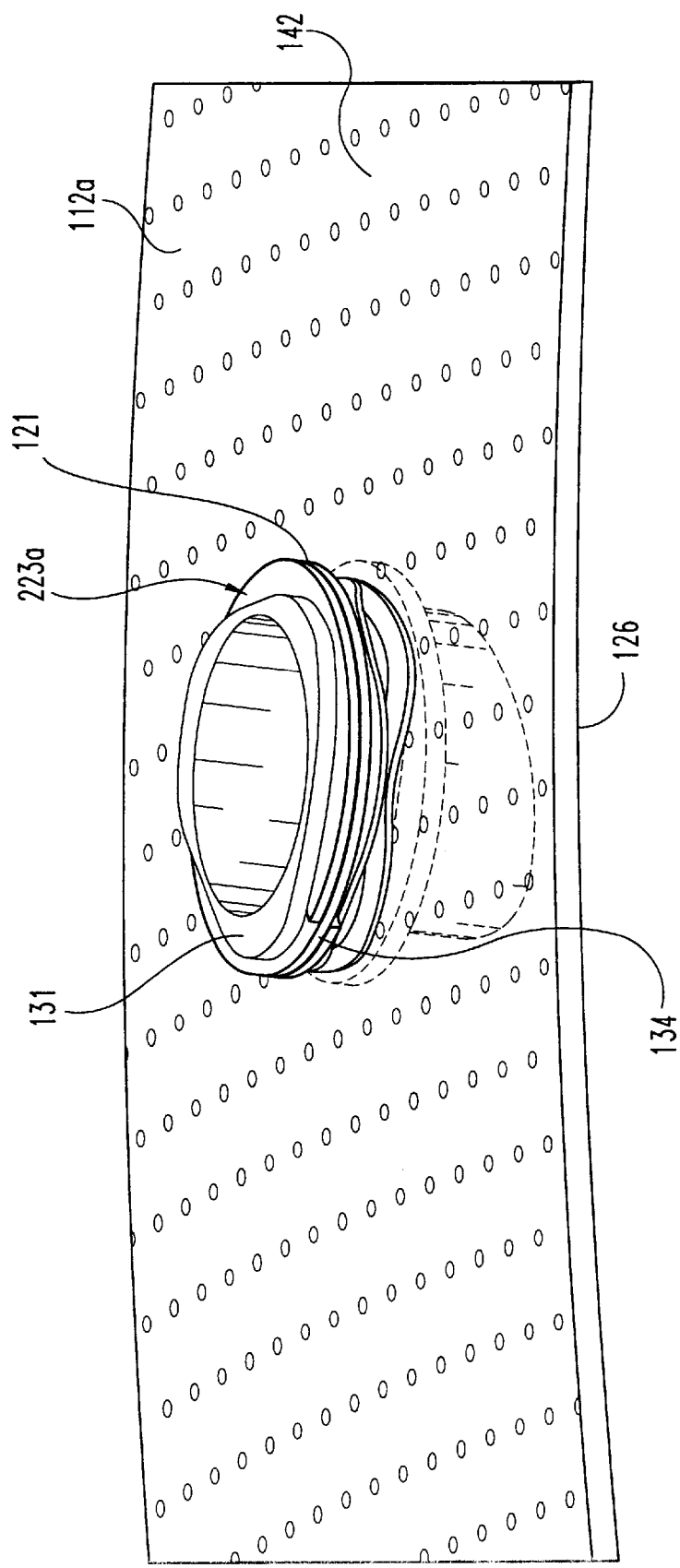
FIG. 10 is a perspective view of the combustor chute assembly of FIG. 9 coupled to a combustor liner.

With reference to FIGS. 9 and 10, there is illustrated an alternate embodiment of the combustor chute coupled to the combustor liner 112a. The combustor chute assembly 323 is substantially similar to the prior combustor chute assemblies and includes an energizing device 221, a load distributing member 121 and the combustor chute 223a. Further, the components are substantially similar to the previously described components and like feature numbers will be utilized to represent like features. The combustor chute 223a is preloaded against the surface 126 of the liner 112a. In one embodiment the energizing devise is a wave washer having a spring rate that preloads the combustor chute 223a against the liner 112a. The load distributing member 121 functions to distribute the load applied from the energizing device 121 to the combustor chute 223a. Further, the load distributing member is preferably, but not limited to, utilized with a ceramic material combustor chute.

A method of installing the removable combustor chute 123a will now be set forth with the aid of FIGS. 1–6. The first end 131 of the combustor chute 123a is passed into the opening 118 within the combustion chamber 124. The first end 131 is passed into the opening 118 to align the second set of lobes 138 within the opening and cause the flange member 140 to be brought into an abutting relation with the inner surface of the combustor liner. Fastener 121 is then engaged within the fastener-receiving portion 134 to releasably secure the combustor chute 123a to the combustor liner 112. The combustor chute 123a can be removed by substantially reversing the above described installation procedure.

While the invention has been illustrated and described in detail in the drawings and foregoing description, the same is considered to be illustrative and not restrictive in character, it is understood that only the preferred embodiments have been shown and described and that all changes and modifications that come within the spirit of the invention are desired to be protected.

We claim:

1. An apparatus, comprising:

a mechanical housing;

a combustor liner located within and spaced from said housing and having at least one opening therethrough, said combustor liner defining a space adapted for the combustion of a fuel;

a member having a first end and a second end and a passageway therethrough adapted for the passage of a fluid into said space for the combustion of fuel, said first end received within said at least one opening and including an anti-rotation structure to inhibit rotation of said member, said second end extending into said space; and means for releasably fastening said first end with said liner.

2. The apparatus of claim 1, wherein said anti-rotation structure includes at least one lobed portion that interengages with a surface defining said at least one opening.

3. The apparatus of claim 1, wherein said anti-rotation structure orients said member in a predetermined position in said at least one opening.

4. An apparatus, comprising:

a mechanical housing;

a combustor liner located within and spaced from said housing and having at least one opening therethrough, said combustor liner defining a space adapted for the combustion of a fuel;

a member having a first end and a second end and a passageway therethrough adapted for the passage of a fluid into said space for the combustion of fuel, said first end received within said at least one opening and said second end extending into said space;

means for releasably fastening said first end with said liner, said means includes a retaining ring to inhibit displacement of said member, said retaining ring engaging said member; and said member having a groove therein to receive said retaining ring, and wherein a portion of said retaining ring abutting an outer surface of said combustor liner.

5. An apparatus, comprising:

a mechanical housing;

a combustor liner located within and spaced from said housing and having at least one opening therethrough, said combustor liner defining a space adapted for the combustion of a fuel;

a member having a first end and a second end and a passageway therethrough adapted for the passage of a fluid into said space for the combustion of fuel, said first end received within said at least one opening and said second end extending into said space, said combustor liner is formed of a first material and said member is formed of a second material that is different from said first material; and means for releasably fastening said first end with said liner.

6. The apparatus of claim 5 wherein one of said combustor liner and said member is formed of a ceramic composition, and the other of said combustor liner and said member is formed by a metallic material.

7. The apparatus of claim 5 wherein said first material can withstand exposure to a higher temperature than said second material.

8. The apparatus of claim 5 wherein said member is formed of a ceramic material.

9. A combustor for a gas turbine engine, comprising a mechanical housing;

a combustor liner located within said housing and defining a combustion chamber adapted for the combustion of a fuel, said combustion liner having at least one opening therein;

a passageway formed between said mechanical housing and said combustor liner, said passageway adapted for the passage of a fluid to said at least one opening;

at least one combustor chute having a first portion received within said at least one opening and in fluid communication with said passageway and a second portion extending into said combustion chamber, said at least one combustor chute includes an anti-rotation structure to prevent rotation of said at least one combustor chute relative to said combustor liner; and a removable fastener engaging with said at least one combustor chute to releasably secure said at least one combustor chute with said combustor liner.

10. The combustor of claim 9 wherein said anti-rotation structure defines a lobed portion.

11. The combustor of claim 9 wherein said anti-rotation structure orients said at least one combustor chute in a predetermined position in said at least one opening.

12. The combustor of claim 9 wherein said combustor liner is of a first material and wherein said at least one combustor chute is of a second material that is different from said first material.

13. The combustor of claim 12, wherein said combustor chute is formed of a ceramic material.

14. The combustor of claim 12 wherein said combustor chute is a unitary structure formed of a ceramic material.

15. The combustor of claim 12, wherein said combustor chute is a unitary structure formed of a metallic material.

16. The combustor of claim 9 which further includes a preload member positioned between said combustor liner and said fastener to draw said combustor chute against said combustor liner.

17. A combustor for a gas turbine engine, comprising a mechanical housing;

a combustor liner located within said housing and defining a combustion chamber adapted for the combustion of a fuel, said combustion liner having at least one opening therein;

a passageway formed between said mechanical housing and said combustor liner, said passageway adapted for the passage of a fluid to said at least one opening;

at least one combustor chute having a first portion received within said at least one opening and in fluid communication with said passageway and a second portion extending into said combustion chamber, said at least one combustor chute is formed of a high temperature resistant ceramic material; and a removable fastener engaging with said at least one combustor chute to releasably secure said at least one combustor chute with said combustor liner.

18. The combustor of claim 17 wherein said fastener is an energizing device that preloads and retains said at least one combustor chute against said combustor liner.

19. The combustor chute of claim 18, wherein said fastener is a spring washer.

20. The combustor of claim 17, wherein said fastener includes a double wound ring.

21. A gas turbine engine combustor chute, comprising:

a single piece ceramic body member having a first end and a second end with a passageway therethrough, said first end having a fastener-receiving portion adapted to receive a fastener therein and to secure said first end with a combustor liner.

22. The combustor chute of claim 21 wherein said first end includes an anti-rotation portion adapted to interengage with a wall member of the combustor liner and prevent rotation of the combustor chute.

23. A method of installing a combustor chute within a gas turbine engine combustor, comprising:

positioning the combustor chute within the combustion chamber;

inserting one end of the combustor chute into an opening formed in a combustor liner of the combustor;

passing at least a portion of the one end of the combustor chute through the combustor liner so that it extends from the liner;

preloading the combustor chute with the combustor liner; and engaging a mechanical fastener with the portion of the combustor chute extending from the combustor liner.

* * * * *